(12) United States Patent
Fitzpatrick et al.

(10) Patent No.: US 7,813,581 B1
(45) Date of Patent: Oct. 12, 2010

(54) BAYESIAN METHODS FOR NOISE REDUCTION IN IMAGE PROCESSING

(76) Inventors: Ben G. Fitzpatrick, 2916 Stanford Ave., Marina del Rey, CA (US) 90292; Allen Robert Tannenbaum, 4214 Cheltingham La., Smyrna, GA (US) 30082

( * ) Notice: Subject to any disclaimer, the term of this patent is extended or adjusted under 35 U.S.C. 154(b) by 1377 days.

(21) Appl. No.: 11/123,445

(22) Filed: May 6, 2005

(51) Int. Cl.
G06K 9/40 (2006.01)
G06K 9/00 (2006.01)
G06K 9/68 (2006.01)
H04N 5/225 (2006.01)

(52) U.S. Cl. .................. 382/260; 382/103; 382/254; 382/263; 382/278; 348/169

(58) Field of Classification Search .................. 382/276
See application file for complete search history.

(56) References Cited

U.S. PATENT DOCUMENTS

| | | | |
|---|---|---|---|
| 5,387,930 A | 2/1995 | Toh | |
| 5,489,782 A | 2/1996 | Wernikoff | |
| 5,640,468 A | 6/1997 | Hsu | |
| 5,684,720 A * | 11/1997 | Hein | 702/185 |
| 5,850,470 A | 12/1998 | Kung et al. | |
| 6,226,409 B1 | 5/2001 | Cham et al. | |
| 6,233,008 B1 * | 5/2001 | Chun | 348/170 |
| 6,240,197 B1 * | 5/2001 | Christian et al. | 382/103 |
| 6,542,621 B1 * | 4/2003 | Brill et al. | 382/103 |
| 6,553,131 B1 | 4/2003 | Neubauer et al. | |
| 6,795,794 B2 | 9/2004 | Anastasio et al. | |
| 6,826,292 B1 * | 11/2004 | Tao et al. | 382/103 |
| 6,826,316 B2 | 11/2004 | Luo et al. | |
| 6,829,384 B2 | 12/2004 | Scheiderman et al. | |
| 6,847,895 B2 | 1/2005 | Nivlet et al. | |
| 6,879,705 B1 * | 4/2005 | Tao et al. | 382/103 |
| 6,999,599 B2 * | 2/2006 | Rui et al. | 382/103 |
| 7,113,185 B2 * | 9/2006 | Jojic et al. | 345/420 |
| 2003/0072482 A1 | 4/2003 | Brand | |
| 2003/0132366 A1 | 7/2003 | Gao et al. | |
| 2004/0022438 A1 | 2/2004 | Hibbard | |

OTHER PUBLICATIONS

Black et al., "Probabilistic Detection and tracking of Motion Discontinuities", IEEE International Conference on Computer Vision, Greece, Sep. 1999.*

(Continued)

*Primary Examiner*—Anand Bhatnagar
*Assistant Examiner*—Jose M Torres
(74) *Attorney, Agent, or Firm*—Gazdzinski & Associates, PC

(57) ABSTRACT

Improved methodology for image processing and object tracking that, inter alia, reduces noise. In one embodiment, the methodology is applied to moving targets, and comprises processing sequences of images that have been corrupted by one or more noise sources (e.g., sensor noise, medium noise, and/or target reflection noise). A likelihood or similar logical construct (e.g., Bayes' rule) is applied to the individual images (or aggregations thereof) of an image sequence in order to generate a posterior image for each observed image. The posterior images are fed-forward to the determination of the posterior image for one or more subsequent images (after smoothing), thereby making these subsequent determinations more accurate. The net result is a more accurate and noise-reduced representation (and location) of the target in each image.

15 Claims, 3 Drawing Sheets

OTHER PUBLICATIONS

Torr et al., "An Integrated Bayesian Approach to Layer Extraction from Image Sequences", IEEE Transactions on Pattern Analysis and Machine Intelligence, vol. 23, No. 3, Mar. 2001, pp. 297-303.*

Morin, "Adaptive Spatial Filtering Techniques for the Detection of Targets in Infrared Imaging Seekers", Proceedings of SPIE, vol. 4025, 2000, pp. 182-193.*

Yilmaz et al., "Target Tracking in Airborne Forward Looking Infrared Imagery", Image and Vision Computing 21, 2003, pp. 623-635.*

Strehl et al., "Detecting Moving Objects in Airborne Forward Looking Infra-Red Sequences", Proceesdings IEEE Workshop on Computer Vision beyond the visible spectrum, Jun. 1999, pp. 3-12.*

Kemper et al., "Imaging Infrared Seeker Processing Overview: Image Processing, Adaptive Thresholding, and Track Processing", Part of SPIE Conference on Infrared Imaging Systems: Design, Analysis, Modeling, and Testing, Apr. 1999, pp. 26-273.*

* cited by examiner

ORIGINAL INTENSITY

WEIGHTING OF PIXEL AND NEIGHBORS

NEW INTENSITY IS WEIGHTED AVERAGE

A = BLUE$_1$
B = RED
C = BLUE$_2$
D = PURPLE $$I_{i,j}^{new} = \sum_{k,l} W_{k,l} I_{i-k,j-l}^{original}$$

BAYESIAN METHODS FOR NOISE REDUCTION IN IMAGE PROCESSING

GOVERNMENT INTERESTS

The invention described herein was made in the performance of work funded by Air Force Research Laboratory under contract F29601-03-0189. The government may have rights to portions of this invention.

RELATED APPLICATIONS

The present application is related to U.S. patent application Ser. No. 11/123,549 entitled "TRACKING APPARATUS AND METHODS USING IMAGE PROCESSING NOISE REDUCTION" filed contemporaneously herewith.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to image processing, and in one exemplary aspect to reducing noise in the optical image-based tracking of objects through random media.

2. Description of Related Technology

Image data processing is useful in a broad variety of different disciplines and applications. One such application relates to the tracking of objects or targets in a random or substantially randomized media. Object tracking through random media is used, for example, in astronomical and space imaging, free space laser communication systems, automated lasik eye surgery, and laser-based weapon systems. Each of these applications requires a high degree of precision.

Inherent in object tracking is the need to accurately locate the object as a function of time. A typical tracking system might, e.g., gather a number of sequential image frames via a sensor. It is important to be able to accurately resolve these frames into regions corresponding to the object or target being tracked, and other regions not corresponding to the object (e.g., background). Making this more difficult are the various sources of noise which may arise in such systems, including: (i) noise generated by the sensing system itself; (ii) noise generated by variations or changes in the medium interposed between the object being tracked and the sensor (e.g., scintillation); and (iii) object reflection or interference noise (e.g., speckle).

One very common prior art approach to image location relies on direct spatial averaging of such image data, processing one frame of data at a time, in order to extract the target location or other relevant information. Such spatial averaging, however, fails to remove image contamination from the aforementioned noise sources. As result, the extracted target locations have a lower degree of accuracy than is desired.

A number of other approaches to image acquisition and processing are disclosed in the prior art as well. For example, U.S. Pat. No. 5,387,930 to Toh issued Feb. 7, 1995 entitled "Electronic image acquisition system with image optimization by intensity entropy analysis and feedback control" discloses an image acquisition system wherein parameters associated with the system, such as any of the lens aperture, the lens focus and image intensity, are adjusted. Incoming image data is processed to determine the entropy of the image and with this information the aperture can be optimized. By determining the dynamic range of the scene, the black and white levels thereof can be identified and the gain and offset applied to the image adjusted to minimize truncation distortion. Specular highlights can be detected by calculating the ratio of changes in maximum and minimum intensities between different but related images.

U.S. Pat. No. 5,489,782 to Wernikoff issued Feb. 6, 1996 entitled "Method and apparatus for quantum-limited data acquisition" discloses a methodology of forming an image from a random particle flux. Particles of the flux are detected by a discrete-cell detector having a cell size finer than conventionally used. The count data are filtered through a band-limiting filter whose bandwidth lies between a bandwidth corresponding to the detector cell size and the flux bandwidth of interest. Outliers may be flattened before filtering. Neighborhoods around each cell are evaluated to differentiate stationary regions (where neighboring data are relatively similar) from edge regions (where neighboring data are relatively dissimilar). In stationary regions, a revised estimate for a cell is computed as an average over a relatively large neighborhood around the cell. In edge regions, a revised estimate is computed as an average over a relatively small neighborhood. For cells lying in an edge region but near a stationary/edge boundary, a revised estimate is computed by extrapolating from data in the nearby stationary region.

U.S. Pat. No. 5,640,468 to Hsu issued Jun. 17, 1997 entitled "Method for identifying objects and features in an image" discloses scene segmentation and object/feature extraction in the context of self-determining and self-calibration modes. The technique uses only a single image, instead of multiple images as the input to generate segmented images. First, an image is retrieved. The image is then transformed into at least two distinct bands. Each transformed image is then projected into a color domain or a multi-level resolution setting. A segmented image is then created from all of the transformed images. The segmented image is analyzed to identify objects. Object identification is achieved by matching a segmented region against an image library. A featureless library contains full shape, partial shape and real-world images in a dual library system. Also provided is a mathematical model called a Parzen window-based statistical/neural network classifier. All images are considered three-dimensional. Laser radar based 3-D images represent a special case.

U.S. Pat. No. 5,850,470 to Kung, et al. issued Dec. 15, 1998 entitled "Neural network for locating and recognizing a deformable object" discloses a system for detecting and recognizing the identity of a deformable object such as a human face, within an arbitrary image scene. The system comprises an object detector implemented as a probabilistic DBNN, for determining whether the object is within the arbitrary image scene and a feature localizer also implemented as a probabilistic DBNN, for determining the position of an identifying feature on the object. A feature extractor is coupled to the feature localizer and receives coordinates sent from the feature localizer which are indicative of the position of the identifying feature and also extracts from the coordinates information relating to other features of the object, which are used to create a low resolution image of the object. A probabilistic DBNN based object recognizer for determining the identity of the object receives the low resolution image of the object inputted from the feature extractor to identify the object.

U.S. Pat. No. 6,226,409 to Cham, et al. issued May 1, 2001 entitled "Multiple mode probability density estimation with application to sequential markovian decision processes" discloses a probability density function for fitting a model to a complex set of data that has multiple modes, each mode representing a reasonably probable state of the model when compared with the data. Particularly, an image may require a complex sequence of analyses in order for a pattern embedded in the image to be ascertained. Computation of the probability density function of the model state involves two main stages: (1) state prediction, in which the prior probability distribution is generated from information known prior to the availability of the data, and (2) state update, in which the posterior probability distribution is formed by updating the prior distribution with information obtained from observing the data. In particular this information obtained from data observations can also be expressed as a probability density function, known as the likelihood function. The likelihood function is a multimodal (multiple peaks) function when a single data frame leads to multiple distinct measurements from which the correct measurement associated with the model cannot be distinguished. The invention analyzes a multimodal likelihood function by numerically searching the likelihood function for peaks. The numerical search proceeds by randomly sampling from the prior distribution to select a number of seed points in state-space, and then numerically finding the maxima of the likelihood function starting from each seed point. Furthermore, kernel functions are fitted to these peaks to represent the likelihood function as an analytic function. The resulting posterior distribution is also multimodal and represented using a set of kernel functions. It is computed by combining the prior distribution and the likelihood function using Bayes Rule.

U.S. Pat. No. 6,553,131 to Neubauer, et al. issued Apr. 22, 2003 entitled "License plate recognition with an intelligent camera" discloses a camera system and method for recognizing license plates. The system includes a camera adapted to independently capture a license plate image and recognize the license plate image. The camera includes a processor for managing image data and executing a license plate recognition program device. The license plate recognition program device includes a program for detecting orientation, position, illumination conditions and blurring of the image and accounting for the orientations, position, illumination conditions and blurring of the image to obtain a baseline image of the license plate. A segmenting program for segmenting characters depicted in the baseline image by employing a projection along a horizontal axis of the baseline image to identify positions of the characters. A statistical classifier is adapted for classifying the characters. The classifier recognizes the characters and returns a confidence score based on the probability of properly identifying each character. A memory is included for storing the license plate recognition program and the license plate images taken by an image capture device of the camera.

U.S. Pat. No. 6,795,794 to Anastasio, et al. issued Sep. 21, 2004 entitled "Method for determination of spatial target probability using a model of multisensory processing by the brain" discloses a method of determining spatial target probability using a model of multisensory processing by the brain includes acquiring at least two inputs from a location in a desired environment where a first target is detected, and applying the inputs to a plurality of model units in a map corresponding to a plurality of locations in the environment. A posterior probability of the first target at each of the model units is approximated, and a model unit with a highest posterior probability is found. A location in the environment corresponding to the model unit with a highest posterior probability is chosen as the location of the next target.

U.S. Pat. No. 6,829,384 to Schneiderman, et al. issued Dec. 7, 2004 entitled "Object finder for photographic images" discloses an object finder program for detecting presence of a 3D object in a 2D image containing a 2D representation of the 3D object. The object finder uses the wavelet transform of the input 2D image for object detection. A pre-selected number of view-based detectors are trained on sample images prior to performing the detection on an unknown image. These detectors then operate on the given input image and compute a quantized wavelet transform for the entire input image. The object detection then proceeds with sampling of the quantized wavelet coefficients at different image window locations on the input image and efficient look-up of pre-computed log-likelihood tables to determine object presence.

U.S. Pat. No. 6,826,316 to Luo, et al. issued Nov. 30, 2004 entitled "System and method for determining image similarity" discloses a system and method for determining image similarity. The method includes the steps of automatically providing perceptually significant features of main subject or background of a first image; automatically providing perceptually significant features of main subject or background of a second image; automatically comparing the perceptually significant features of the main subject or the background of the first image to the main subject or the background of the second image; and providing an output in response thereto. In the illustrative implementation, the features are provided by a number of belief levels, where the number of belief levels are preferably greater than two. The perceptually significant features include color, texture and/or shape. In the preferred embodiment, the main subject is indicated by a continuously valued belief map. The belief values of the main subject are determined by segmenting the image into regions of homogenous color and texture, computing at least one structure feature and at least one semantic feature for each region, and computing a belief value for all the pixels in the region using a Bayes net to combine the features.

U.S. Pat. No. 6,847,895 to Nivlet, et al. issued Jan. 25, 2005 entitled "Method for facilitating recognition of objects, notably geologic objects, by means of a discriminant analysis technique" discloses a method for facilitating recognition of objects, using a discriminant analysis technique to classify the objects into predetermined categories. A learning base comprising objects that have already been recognized and classified into predetermined categories is formed with each category being defined by variables of known statistical characteristics. A classification function using a discriminant analysis technique, which allows distribution among the categories the various objects to be classified from measurements available on a number of parameters, is constructed by reference to the learning base. This function is formed by determining the probabilities of the objects belonging to the various categories by taking account of uncertainties about the parameters as intervals of variable width. Each object is then assigned, if possible, to one or more predetermined categories according to the relative value of the probability intervals. The present invention does not require a library of known shapes (even if only known in a statistical sense). The present invention instead classifies each pixel, and shapes are inferred nonparametrically from the resulting posterior image.

United States Patent Publication No. 20030072482 to Brand published Apr. 17, 2003 entitled "Modeling shape, motion, and flexion of non-rigid 3D objects in a sequence of images" discloses a method of modeling a non-rigid three-dimensional object directly from a sequence of images. A shape of the object is represented as a matrix of 3D points, and a basis of possible deformations of the object is represented as a matrix of displacements of the 3D points. The matrices of 3D points and displacements forming a model of the object. Evidence for an optical flow is determined from image intensities in a local region near each 3D point. The evidence is factored into 3D rotation, translation, and deformation coefficients of the model to track the object in the video.

United States Patent Publication No. 20030132366 Gao, et al. published Jul. 17, 2003 "Cluster-weighted modeling for media classification" discloses a probabilistic input-output system is used to classify media in printer applications. The probabilistic input-output system uses at least two input parameters to generate an output that has a joint dependency on the input parameters. The input parameters are associated with image-related measurements acquired from imaging textural features that are characteristic of the different classes (types and/or groups) of possible media. The output is a best match in a correlation between stored reference information and information that is specific to an unknown medium of interest. Cluster-weighted modeling techniques are used for generating highly accurate classification results.

United States Patent Publication No. 20040022438 to Hibbard published Feb. 5, 2004 entitled "Method and apparatus for image segmentation using Jensen-Shannon divergence and Jensen-Renyi divergence" discloses a method of approximating the boundary of an object in an image, the image being represented by a data set, the data set comprising a plurality of data elements, each data element having a data value corresponding to a feature of the image. The method comprises determining which one of a plurality of contours most closely matches the object boundary at least partially according to a divergence value for each contour, the divergence value being selected from the group consisting of Jensen-Shannon divergence and Jensen-Renyi divergence.

Despite the foregoing plethora of different approaches to object location and image processing, there is still an unsatisfied need for practical and effective methods that account for sensor-based, medium-induced, and/or reflection related noise sources. Ideally, such improved methods would be readily implemented using extant hardware and software, and would utilize information on an inter-frame (frame-to-frame) basis in order to isolate and remove unwanted noise artifact, thereby increasing the accuracy of the image (and location).

SUMMARY OF THE INVENTION

The present invention satisfies the foregoing needs by providing, inter alia, improved methods for image processing and noise reduction.

In a first aspect of the invention, a method of reducing noise associated with a series of images obtained from a moving object is disclosed. In one embodiment, the method comprises: providing at least first and second frames of image data, each of the frames comprising a plurality of pixels; for the first frame, calculating the posterior probability that each of the plurality of pixels is a pixel of the target based at least on part on a prior probability; forming a posterior probability image based at least in part on the act of calculating; and utilizing at least a portion of the posterior probability image for use as a prior probability for at least the second frame. The noise comprises at least one of sensor-related noise, medium-related noise and target reflection noise, and is removed via the application of a Bayesian function to at least a portion of the prior probability to generate a posterior probability image which is then used as the prior probability for one or more subsequent frames.

In another embodiment, the method comprises: for a plurality of pixels of a first image, calculating a posterior probability $(\pi^+)$ that each pixel $(i, j)$ comprises a target pixel given an image observed at a first time using a prior probability value; forming a posterior probability image based on the posterior probabilities for each of the pixels; and smoothing the posterior probability image by filtering at least portions of the posterior image to produce a result, and storing the result for use as a prior probability for an image observed at a time subsequent to the first time.

In a second aspect of the invention, a method of processing image data comprising data comprising a plurality of pixels is disclosed. In one embodiment, the method comprises: classifying at least a portion of the pixels into one of a plurality of classes; and processing the image data based at least in part on the act of classifying. Image data for at least a first frame is classified and processed for use in processing at least a second subsequent frame of image data. In one variant, the processing of each frame of data comprises applying Bayes' rule to develop a posterior probability which is then used as a prior probability for a subsequent frame.

In a third aspect of the invention, a method of tracking a moving object is disclosed. In one embodiment, the method comprises: obtaining a first image having a plurality of pixels; for the plurality of pixels, calculating a first probability of the pixels comprising a pixel associated with the object, the act of calculating being based at least in part on a second probability of an image obtained from an image prior to the first image; determining a first location of the object based at least in part on the first probability; obtaining a second image having a second plurality of pixels, the second image being obtained after the first image; for the second plurality of pixels, calculating a third probability of the pixels comprising a pixel of the object, the act of calculating being based at least in part on the first probability; and determining a second location of the object based at least in part on the third probability.

In a fourth aspect of the invention, a method of propagating the posterior forward in time is disclosed. In exemplary situations of dynamic target motion or of dynamic media perturbing the image process, one embodiment of the method includes a prediction step to complement the correction step of the posterior determination from the prior and the likelihood. One variant includes a drift-diffusion prediction mechanism. The posterior is shifted, spatially, if target and/or medium dynamics have mean or deterministic motion over time. Fluctuations in the motion of a random nature are modeled as diffusive. Mathematical and algorithmic treatment of these two phenomena involves image shifting and image smoothing.

BRIEF DESCRIPTION OF THE DRAWINGS

The features, objectives, and advantages of the invention will become more apparent from the detailed description set forth below when taken in conjunction with the drawings, wherein.

DETAILED DESCRIPTION OF THE INVENTION

Figure 1:
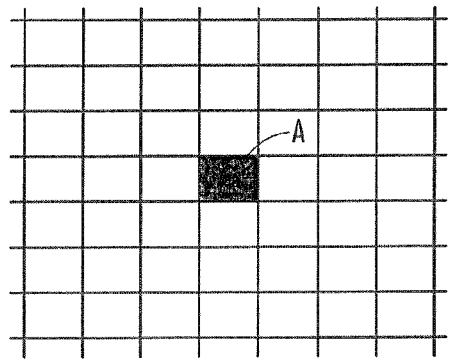
FIG. 1 is a graphical representation of a typical prior art "spatial averaging" approach to image processing of consecutive frames.
Figure 1:
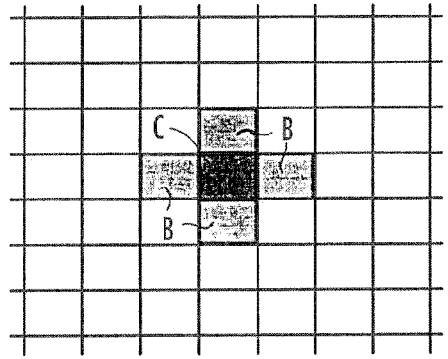
Figure 1:
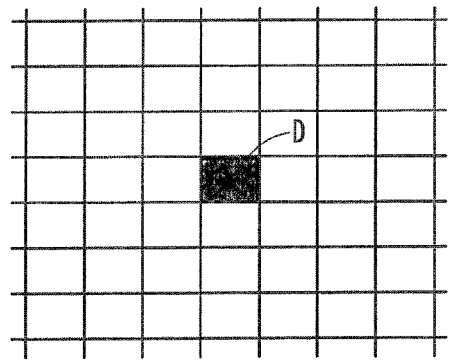

Reference is now made to the drawings wherein like numerals refer to like parts throughout.

Overview

In one aspect, the present invention discloses a method adapted to reduce noise, and accordingly provide a sharp (low-noise) image and location of a target or other object from a sequence of images.

In one embodiment, the images are derived from active illumination, and a segmentation approach is utilized in which the images resulting from such active illumination are segmented into two classes (e.g., target and background) by employing Bayes' theorem to the probability density functions and a prior probability from a preceding frame. A posterior probability representing the likelihood that a pixel is target or background, given the observation, is then derived.

Temporal data processing may also be used with the aforementioned Bayesian segmentation by smoothing and/or shifting the posterior probability, and using the previous frame's posterior data as the "prior" data for a subsequent frame or frames. This processing is implemented in situations of target, platform, or medium motions.

The aforementioned approaches (i.e., posterior probability generation and application across one or more successive frames of image data) effectively isolates the components of the image that result from sensor, medium, or target reflection noise, thereby advantageously allowing these components to be isolated, and a sharper image of the target object (and better determination of its location) to be obtained at any point in time.

Salient advantages and features of the invention include, inter alia: (i) extraction of target information in the presence of very low signal-to-noise environments, uncertain target shape and size, noise sources of various types and different character; (ii) obviation of multi-modal likelihood functions, since a small number of classes are used to enhance and segment the images processed; (iii) probabilities associated with target likelihoods are propagated forward in time as additional data are collected, as opposed to direct production of an estimate of target location; (iv) no requirement for the use of or inference of a reference shape (although one may be optionally used consistent with the invention); and (v) significant robustness with respect to target and noise uncertainties.

DESCRIPTION OF EXEMPLARY EMBODIMENTS

Various aspects and embodiments of the present invention are now described in detail.

It will be recognized by those of ordinary skill that the embodiments described herein are merely exemplary of the broader concept of providing enhanced image processing for, inter alia, target tracking. Many different variations of the methodology (some of which are described herein) may be employed consistent with the invention. For example, while the exemplary embodiments described herein are used for tracking of targets or projectiles, the present invention may be used for processing images in any number of different applications including, without limitation, astronomical and space imaging, free space laser communication systems, automated lasik eye surgery, and weapon systems (e.g., laser based), any of which can benefit from enhanced image clarity and accuracy.

Image Processing Methodology

Figure 2:
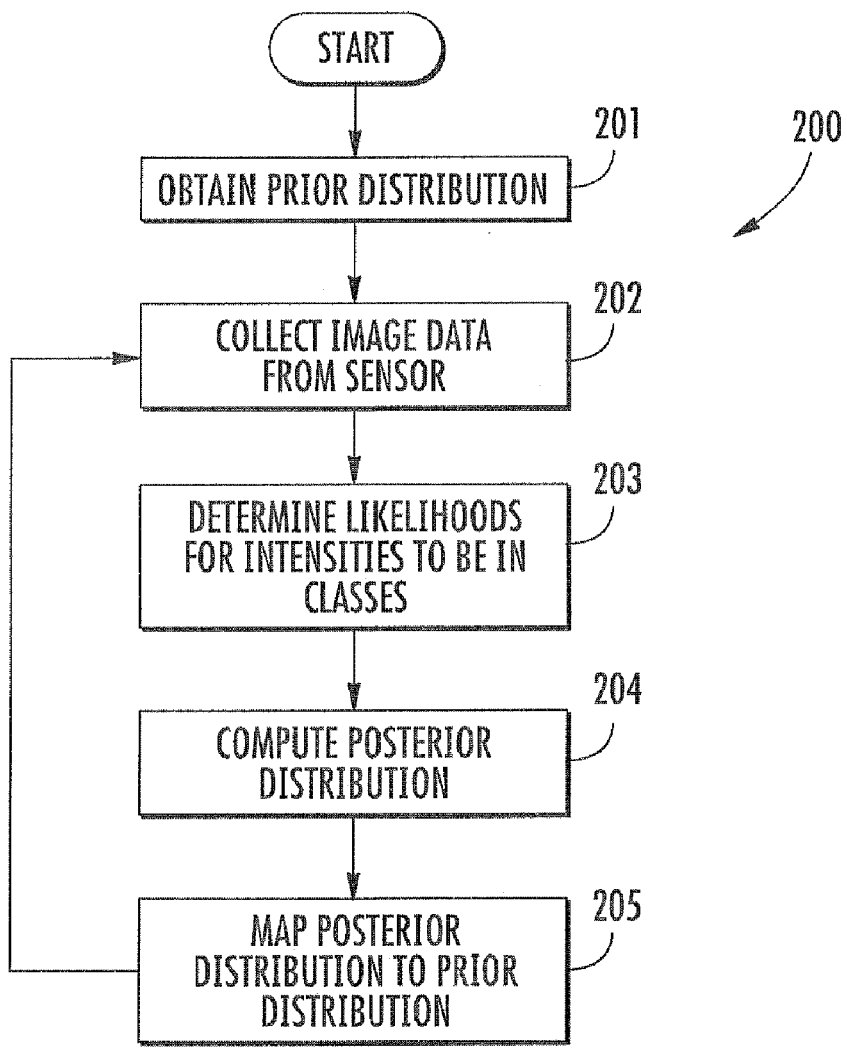
FIG. 2 is a logical flow diagram illustrating a generalized methodology of image processing according to the present invention.
Figure 3:
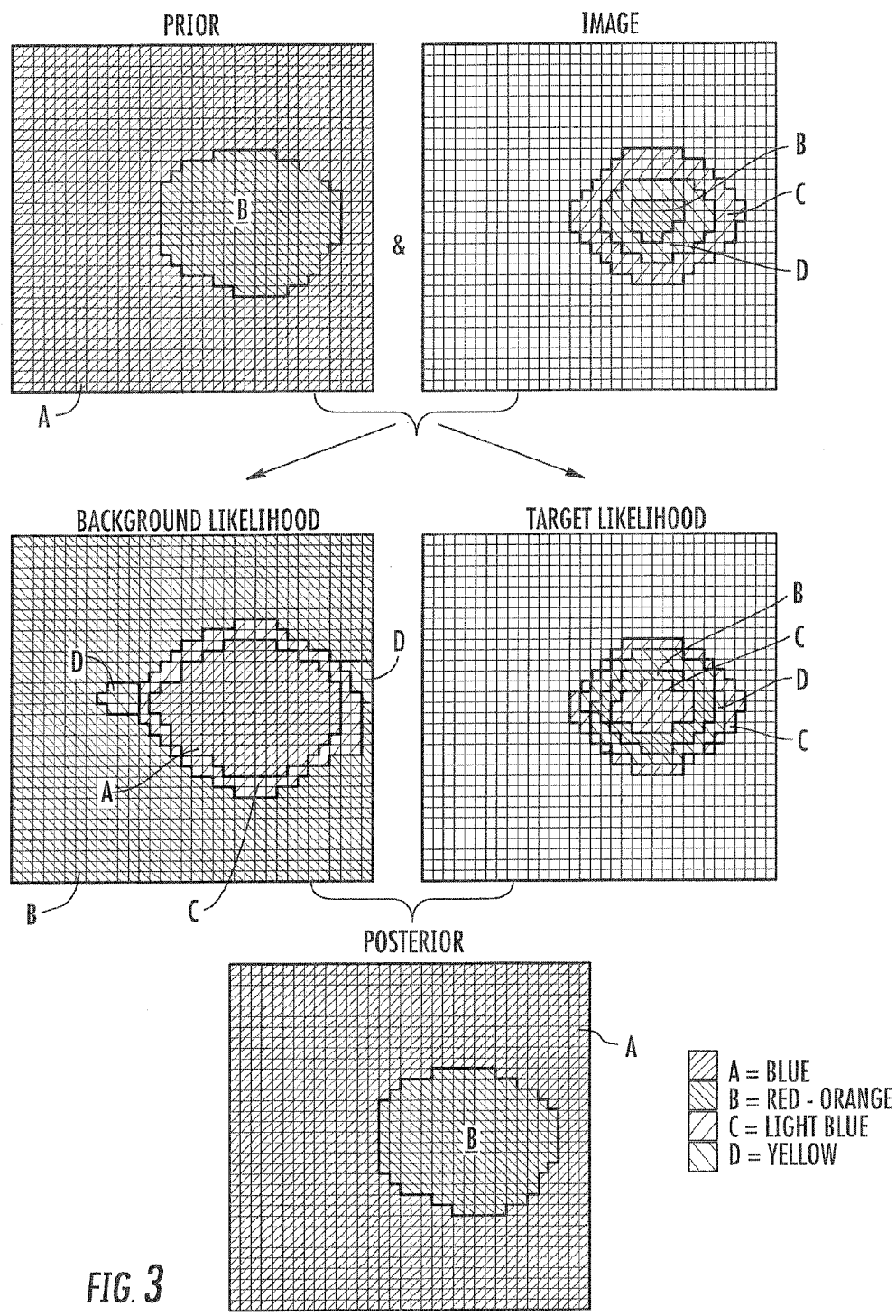
FIG. 3 is a graphical representation of the image processing methodology of FIG. 2.

Referring now to FIGS. 2 and 3, an exemplary embodiment of the generalized method of image processing according to the present invention is described in detail. The methodology of FIG. 2 is broadly applicable to processing image data derived from literally any kind of object of any scale, whether by active illumination or other means (e.g., passive sensing).

As shown in FIG. 2, the first step 201 in the exemplary method 200 comprises obtaining the prior. Next, per step 202, a plurality of image data (e.g., image frames) are captured. This may be accomplished using any number of techniques, including (i) obtaining the image data by actively illuminating the object with an illumination source (such as, e.g., a source of electromagnetic radiation including coherent (laser) light or infrared radiation) and sensing the remitted or reflected energy therefrom, or (ii) obtaining the image data via a passive sensor (such as an optical or IR sensor) to detect the reflected or remitted energy generated by ambient or indigenous illumination sources such as the Sun or Moon, or by the object itself (such as when detecting the object's IR signature).

The next step 203 in the method 200 comprises computation of one or more likelihood probabilities. Exemplary processing conducted during this step 203 is described in detail below with respect to FIG. 3. In one approach, a Bayesian segmentation is utilized in which the images obtained as part of step 202 are segmented into multiple (e.g., 2) classes by employing a logical construct or rule system (here, Bayes' theorem) to the probability density functions and prior probability. A posterior probability representing the likelihood that a pixel is within one class or another, given the observation, is then derived per step 204.

Lastly, the final step 205 in the method 200 comprises temporal processing from one frame to the next (i.e., using data from one frame to affect the decision-making process of one or more subsequent frames). Specifically, the aforementioned posterior probabilities for the current image frame of data are mapped into the "prior" probabilities for the next image. The propagation of posterior (for current) to prior (for future) is the means of capturing the dynamic processes of the moving target, as well as those associated with the medium through which the images are being captured. Such medium may comprise, for example, air (or other types of atmosphere), the vacuum of space, or even other media such as water or other liquids. The forward propagation of the posterior data provides an effective mechanism for isolating these dynamic processes and removing them from the underlying image, in effect filtering image noise.

FIG. 3 is a graphical representation of the foregoing methodology 200, illustrating the "feed forward" nature of the process where the posterior probabilities associated with a given frame are utilized as the prior probabilities for calculation of the posterior probability in a subsequent frame. The methodology shown in FIG. 3 therefore intrinsically passes "intelligence" from one frame to the next in order to account for noise artifacts, in contrast to the prior approach of FIG. 1 previously described, wherein spatial averaging of pixels is used in isolation, with no such feed-forward intelligence regarding noise or object motion is present.

One exemplary embodiment of the image processing portion (steps 203, 204, and 205) of the generalized method 200 of FIG. 2 is described.

As in the method of FIG. 2, Bayes' rule is applied such that each pixel ij in an image I is designated as being either a target pixel or background pixel, depending on the intensity level. A prior distribution is specified at the outset such as from the immediately prior image data frame, and a measurement distribution is used to model likely pixel intensities for target or background. Thus, it is assumed that an underlying image can be defined by a matrix $u_{ij}$, which is a matrix of 1's and 0's in the illustrated embodiment. Specifically, the 1's denote those pixels that are in the target class (e.g., part of the missile or other object being tracked), and the 0's denote background or non-target pixels (i.e., those not part of the target). In this fashion, the underlying image is divided into two sets of pixels: (i) target pixels and (ii) background pixels.

It will be appreciated, however, that the invention is not limited to division into only two classes of pixels. For example, in one alternate embodiment, three (3) classes are created, wherein the matrix $u_{ij}$, is resolved into a non-binary system (whether represented by binary variables or otherwise). For example, in one variant, the three classes may comprise: (1) target, (2) unresolved, and (3) background, wherein the "unresolved" class may be made subject to additional processing for resolution of the ambiguity. Instead of using a simple "0" and "1" system, this variant may use a mathematical base other than base-2 (binary) to represent the three states for each pixel, or alternatively simply use two or more binary bits (e.g., "00"=background, "01" or "10"=unresolved, and "11"=target). Other numbers of classes and categorization schemes can be used consistent with the present invention, such alternates being readily implemented by those of ordinary skill in the mathematical or signal processing arts. In particular, for larger targets with gradations of reflectivity (due, for example to three dimensional shapes), multiple classes can be used to provide a higher resolution image of the target.

It will be appreciated that the nature of the various (e.g., two) pixel classes is dependent upon the particular problem domain in which the invention is applied. In the exemplary embodiment, the prior distribution assigns a probability to each pixel: $\pi_{ij}$ denotes the probability that pixel ij is a target pixel (that is, the probability that $u_{ij}=1$). Then, the application of Bayes' rule provides the posterior distribution for pixel intensities (step 204).

Bayes' rule for computing the probability (P) of a "target" given visual input (V) can be generally stated as follows:

$$P(T|V)=[P(V|T)/P(V)]P(T) \qquad \text{Eqn. (1)}$$

Bayes' rule essentially computes the conditional posterior probability of the target given a sensory input P(T|V) by modifying the unconditional prior probability of the target P(T) on the basis of sensory input V. The conditional probability P(V|T) is the likelihood of observing some combination of V, given the target. The unconditional probability P(V) is the likelihood of observing the same input V under any circumstances.

Thus, Bayes' rule can be used to compute P(T|V) by multiplying P(T) by the ratio of P(V|T) to P(V). As an example, if the expectation of a target is 10% (in the absence of sensory input), then P(T) would equal 0.1. If an input (e.g., V=20) is observed, and if this input is twice as likely when associated with a target as under general circumstances, then the ratio of P(V|T) to P(V) is equal to 2. On the basis of this sensory input, Bayes' rule states that P(T|V) should equal 0.2. Thus, the prior target probability P(T)=0.1 has been modified by the sensory input to the posterior target probability P(T|V)=0.2. Hence, on the basis of the sensory input received, the chances of a target are increased from 10% to 20%. See, e.g., Berger, J. O. *Statistical Decision Theory and Bayesian Analysis*, Springer-Verlag, New York, 1985, incorporated herein by reference in its entirety, for a discussion of Bayes' rule and related topics.

In the present context, the posterior is the conditional probability that $u_{ij}=1$ (target pixel) given the image that has been observed. This computation involves the exemplary formula of Eqn. (2):

$$\pi_{ij}^{+} = \frac{f(I_{ij}|1)\pi_{ij}}{f(I_{ij}|1)\pi_{ij} + f(I_{ij}|0)(1-\pi_{ij})}, \qquad \text{Eqn. (2)}$$

wherein $f$ denotes the likelihood of a pixel intensity given the type of pixel (background or target), and $\pi$ denotes the prior distribution. The posterior then represents the likelihood that a pixel is target or background, given the observation. In a sense, the posterior provides a nonlinear weighting of the image, which can then be used to extract the desired feature (e.g., nose or centroid).

The likelihood function $f$ of Eqn. (2) is used to model the specific nature of the image capture process, including any noise processes associated therewith. In particular, the function $f$ encodes sensor noise levels as well as medium-induced noise levels.

The next step in the image processing methodology 200 comprises the temporal processing from one frame to the next. In the exemplary embodiment, the posterior probabilities for the current image frame of data are mapped into prior probabilities for the next image (step 205). The implementation of this step depends on the application of interest. When the target and platform are stationary, and the medium does not introduce image fluctuations, the posterior may be used directly as the prior for the next frame. Conversely, dynamic targets, platforms, and media require additional posterior processing. The posterior image is shifted according to known or estimated target and platform dynamics, so that the posterior will overlay the target in the subsequence frame. Uncertainty or fluctuations in the dynamics may not allow the target to be predicted exactly: in such a case the prior must be obtained by integrating the posterior against possible fluctuations. The algorithmic and mathematical embodiment of this integration comprises the application of a smoothing filter to the posterior and then storing the filtered result for use in the next iteration.

The propagation of posterior (for current) to prior (for future) is the means of capturing the dynamic processes of the target, as well as the medium through which the images are being captured. The mapping of Eqn. (3) describes this process:

$$\pi_{ij}^{f}=S(\pi^{+})_{ij} \qquad \text{Eqn. (3)}$$

Here, $\pi_{ij}^{f}$ denotes the future prior, which is determined from the current posterior $\pi^{+}$ by the mapping S. In one embodiment of the invention, the mapping S comprises a Gaussian-smoothing convolution to capture target motion:

$$\pi_{ij}^{f} = \sum_{k,l} N\exp\left(-\frac{1}{2\tau^2}((i-k-m_x)^2 + (i-j-m_y)^2)\right)\pi_{kl}^{+}, \qquad \text{Eqn. (4)}$$

in which N is a normalizing constant used to ensure that the output of the filter is a probability image. This convolution implements the assumption that the frame-to-frame fluctuations around their mean values ($m_x$, $m_y$) are Gaussian random noise.

It will be appreciated, however, that other mapping approaches may be used. The posterior-to-prior propagation can be implemented in a number of ways. Of particular importance is the generalization of Gaussian smoothing. Note that the Gaussian convolution is the Green's function solution of the convection-diffusion equation (ref here). That is, per Eqn. (5):

$$\frac{\partial u}{\partial t} + v_x \frac{\partial u}{\partial x} + v_y \frac{\partial u}{\partial y} = \frac{\tau^2}{2}\left(\frac{\partial^2 u}{\partial x^2} + \frac{\partial^2 u}{\partial y^2}\right) \quad \text{Eqn. (5)}$$

with initial distribution $f$ having as its solution:

$$u(t, x, y) = \int\int f(x', y') \frac{1}{2\pi t \tau^2} \exp\left(-\frac{1}{2t\tau^2}((x - x' - v_x t)^2 + (y - y' - v_y t)^2)\right) dx' dy' \quad \text{Eqn. (6)}$$

The Gaussian filter implementation described above, then, is equivalent to the propagation forward in time of the convection-diffusion equation, with the posterior image as the initial distribution. The deterministic or mean motion of the target and platform correspond to the convection term, while the random fluctuations and uncertain dynamics are modeled with the diffusion term.

The recognition that Gaussian filtering is equivalent to convection and diffusion leads to a large family of other embodiments of the posterior propagation. Nonlinear partial differential equation filters are another embodiment of the invention. For example, the relationship of Eqn. (7)

$$\frac{\partial u}{\partial t} + F|\nabla u| = 0 \quad \text{Eqn. (7)}$$

propagates the posterior forward in time with a nonlinear filter. Note that the boundaries between classes propagate according to the Eikonal equation. Eikonal functions are well known classical objects in optics. See., e.g., O. N. Stavroudis, *The Optics of Rays, Wavefronts and Caustics*, Academic Press, 1972, pp. 200-207, incorporated herein by reference. The Eikonal equation is shown in Eqn. (8):

$$(\nabla s)^2 = n^2 \quad \text{Eqn. (8)}$$

The related Eikonal transport equation is shown in Eqn. (9):

$$(\nabla f \cdot \nabla)V + 0.5(\nabla \cdot \nabla s)V = 0 \quad \text{Eqn. (9)}$$

The Eikonal condition equation is shown in Eqn. (10):

$$(\nabla \cdot \nabla)V = 0 \quad \text{Eqn. (10)}$$

Where:
 s is a scalar function of position;
 V is a vector function of position;
 n is the refraction index;
 $\nabla$ is the Del (gradient) operator; and
 · is the dot product.

The Eikonal equation comprises the phase function in a situation for which the phase and amplitude are slowly varying functions of position. Constant values of the eikonal represent surfaces of constant phase, or wavefronts. The normals to these surfaces are rays. Hence, the Eikonal equation gives a method for "ray tracing" in a medium of slowly varying index of refraction (or the equivalent for other kinds of waves).

It will also be appreciated that while the foregoing embodiment of the methodology uses posterior probabilities of the current image as the prior probabilities for the next subsequent frame, these posterior probabilities can be used for other subsequent frames (e.g., they can be applied non-sequentially), and/or used according to other schemes. For example, in one variant, the posterior probabilities for the prior n (n comprising an integer) frames are stored and mathematically or logically combined to generate an "average" prior probability value for the subsequent frame. In this fashion, the prior probability value used in a subsequent frame calculation is akin to a "moving average" of sorts, with the current posterior probability accordingly being the result of posterior data gathered over multiple prior frames. It will be recognized by those of ordinary skill that any number of different types of mathematical or logical processing of the multiple probability data can be used, depending on the particular application. For example, one variant envisaged comprises generating a simple mathematical average of the n values, such as shown in Eqn. (11):

$$(p_1 + p_2 + \ldots p_n)/n \quad \text{Eqn. (11)}$$

Alternatively, a weighted average could be used, such as where the data from the more recent frames is more heavily weighted than the data from earlier frames.

It will also be appreciated that the application of the Bayesian rules to the prior distribution to produce the posterior distribution for the current frame can be accomplished using multiple pixels from successive frames. For instance, in the context of the foregoing example of n frames of data, this data can be used to form an aggregated or composite prior distribution function, to which the Bayesian rules are then applied. This approach is particularly useful in cases where processing of every frame is not desired, possible or required, such as where the image frame rate exceeds the indigenous processing capability of the image data processing device. Especially in cases of slow dynamics with temporally correlated fluctuations from the medium, target, or from platform-induced noise, processing of multiple frames of past data is an appropriate implementation of the invention.

It is also noted that while the foregoing embodiments utilize pixel intensity level (i.e., the classification of a pixel as being either target or background is based on the sensor-derived intensity associated with that pixel), the methodologies of the present invention can utilize other metrics either alone or in combination with intensity for pixel classification. For example, pixel position within the gate 100, and/or pixel position relative to other pixels in the gate, may be useful in classifying a given pixel. Consider, e.g., the case where for whatever reason, a single higher-intensity ("target") pixel is surrounded completely by lower intensity ("background") pixels. Such single target pixel would be highly suspect of having been mis-classified, since there is very little likelihood that it actually corresponds to a part of the target object. Hence, one could fashion a second metric to be used with intensity, for example a "disparity" metric which is a measure or index of the relative uniformity of a pixel with its immediate surroundings. Pixels with extremely low uniformity metric values could be selectively analyzed further, or even discarded, since they raise undesirable ambiguity. Myriad other such approaches and metrics for aiding in the classification of individual pixels or groups of pixels are envisaged and readily implemented by those of ordinary skill provided the present disclosure.

As previously noted, the mapping of the posterior probabilities for the current image frame of data into prior probabilities for the next image is the mechanism by which the dynamic inter-frame processes (including the various noise sources such as sensor noise, medium-related scintillation, and target reflection "speckle") are determined such that they can be accounted for. This approach is in contrast to the prior art approach of direct spatial averaging of image data, wherein a single frame of data at a time is processed in order to extract the target location. As a result, the extracted target locations obtained using the present methodology are significantly more accurate, since contamination by the aforementioned sensor-based and medium-induced noise sources is substantially removed.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of reducing noise associated with a series of images obtained from a moving target, comprising:
    providing at least first and second frames of image data, each of said frames comprising a plurality of pixels;
    for said first frame, calculating the posterior probability that each of said plurality of pixels is a pixel of said target based at least in part on a prior probability;
    forming a posterior probability image based at least in part on said act of calculating;
    forming a reduced noise image by applying a filtering operation to said posterior probability image for use as a prior probability for at least said second frame; and
    providing said reduced noise image to a tracking system.

2. The method of claim 1, wherein said noise comprises at least one of sensor-related noise, medium-related noise and target reflection noise.

3. The method of claim 1, wherein said act of providing said at least first and second frames of image data comprises:
    illuminating said target with an energy source; and
    obtaining said at least first and second frames using a sensor adapted to detect energy emitted by said source and reflected off of said target.

4. The method of claim 1, wherein said act of calculating comprises applying a Bayesian function to at least a portion of said prior probability.

5. The method of claim 4, wherein said calculating is based at least in part on the intensity level associated with a given one of said pixels.

6. The method of claim 1, wherein said filtering at least a portion of said posterior probability image comprises performing a Gaussian-smoothing convolution.

7. The method of claim 1, wherein said filtering at least a portion of said posterior probability image comprises performing a nonlinear propagation.

8. A method of reducing noise in images, comprising:
    for a plurality of pixels of a first image, calculating a posterior probability ($\pi^+$) that each pixel (i, j) comprises a target pixel given an image observed at a first time using a prior probability value;
    forming a posterior probability image based on said posterior probabilities for each of said pixels;
    smoothing said posterior probability image by filtering at least portions of said posterior image to produce a reduced noise image, and storing said reduced noise image for use as a prior probability for an image observed at a time subsequent to said first time; and
    providing said reduced noise image to a tracking system.

9. A method of reducing noise associated with a series of images obtained from a moving target, comprising:
    providing at least first and second frames of image data, each of said frames comprising a plurality of pixels;
    for said first frame, calculating the posterior probability that each of said plurality of pixels is a pixel of said target by applying a Bayesian function based at least in part on a prior probability;
    forming a posterior probability image based at least in part on said act of calculating;
    forming a reduced noise images by applying a filtering operation comprising a Gaussian-smoothing convolution to said posterior probability image for use as a prior probability for at least said second frame; and
    providing said reduced noise images to a tracking system.

10. The method of claim 9, wherein said noise comprises at least one of sensor-related noise, medium-related noise and/or target reflection noise.

11. The method of claim 9, wherein said act of providing said at least first and second frames of image data comprises:
    illuminating said target with an energy source; and
    obtaining said at least first and second frames using a sensor adapted to detect energy emitted by said source and reflected off of said target.

12. The method of claim 9, wherein said calculating is based at least in part on the intensity level associated with a given one of said pixels.

13. A method of sequentially processing frames of image data comprising a plurality of pixels, said method comprising:
    assigning likelihoods of said pixels belonging to one of a plurality of classes;
    processing said image data based at least in part on said act of assigning likelihoods; and
    utilizing said processed image data in a tracking system;
    wherein said act of assigning likelihoods comprises assigning a likelihood to at least a first frame of image data, and said act of processing further comprises processing at least portions of said first frame of image data for use in processing at least one subsequent frame of image data; and
    wherein said use in processing said at least one subsequent frame of image data comprises performing a mapping of posterior data to future prior data using at least one of a Gaussian-smoothing convolution or nonlinear propagation.

14. A method of reducing noise associated with a series of images obtained from a moving target, comprising:
   providing at least first and second frames of image data, each of said frames comprising a plurality of pixels;
   for said first frame, calculating the posterior probability that each of said plurality of pixels is a pixel of said target based at least in part on a prior probability;
   forming a posterior probability image based at least in part on said posterior probability; and
   forming a reduced noise image by processing said posterior probability image for use as a prior probability for at least said second frame;
   wherein said reduced noise image is provided to a system capable of using said reduced noise image in providing a function relating to said target.

15. A method of reducing noise associated with a series of images obtained from a moving target, comprising:
   a step for providing at least first and second frames of image data, each of said frames comprising a plurality of pixels;
   a step for, for said first frame, calculating the posterior probability that each of said plurality of pixels is a pixel of said target based at least in part on a prior probability;
   a step for forming a posterior probability image based at least in part on said posterior probability;
   a step for forming a reduced noise image by processing said posterior probability image for use as a prior probability for at least said second frame; and
   a step for providing said reduced noise image to a system capable of using said reduced noise image in providing a function relating to said target.

* * * * *